United States Patent [19]  
Adler

[11] 3,734,622  
[45] May 22, 1973

[54] APPARATUS FOR PHOTOMETRICALLY ANALYZING A DROPLET OF A SAMPLE LIQUID
[75] Inventor: Stanford L. Adler, Monsey, N.Y.
[73] Assignee: Technicon Instruments Corporation, Tarrytown, N.Y.
[22] Filed: Nov. 19, 1971
[21] Appl. No.: 200,545

[52] U.S. Cl. .................. 356/103, 356/246, 356/181, 250/218
[51] Int. Cl. ........ G01r 21/00, G01j 3/46, G01r 21/26
[58] Field of Search ...................... 356/103, 102, 181, 356/182, 38, 70, 244, 246; 250/218

[56] References Cited  
UNITED STATES PATENTS

| 3,520,609 | 7/1970 | Lion | 350/218 X |
|---|---|---|---|
| 3,432,275 | 3/1969 | Unger | 356/244 X |
| 3,263,553 | 8/1966 | Baruch | 356/201 |
| 1,939,088 | 12/1933 | Styer | 356/201 |
| 2,176,618 | 10/1939 | Wilson | 356/70 |

Primary Examiner—Ronald L. Wibert  
Assistant Examiner—Conrad Clark  
Attorney—Tedesco & Rockwell

[57] ABSTRACT

Method and apparatus for photometrically testing for a constituent of a droplet of a discrete liquid sample having an arcuate surface and having a planar surface resting on or suspended from a surface and wherein light rays from a source are directed into the droplet through the planar surface thereof. Light energy as a measure of absorbance, light scattering or fluorescence is transmitted through the planar droplet surface to a photodetector for analysis of the sample which analysis may be qualitative or quantitative or indicate an end reaction. Such analysis may be automated.

13 Claims, 4 Drawing Figures

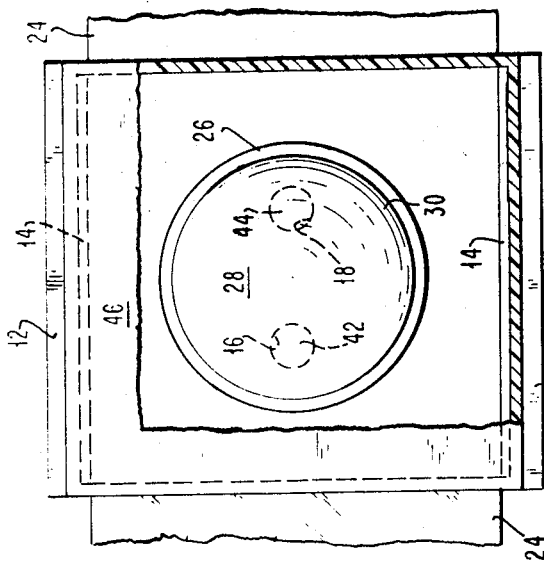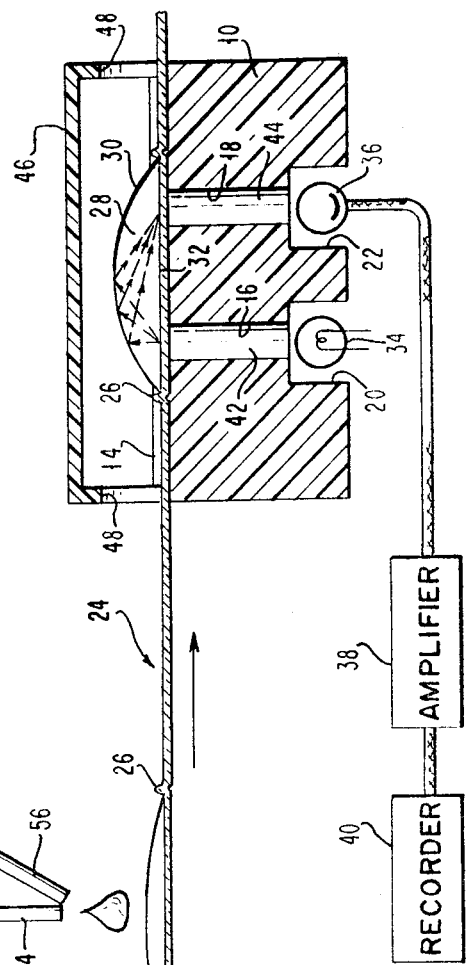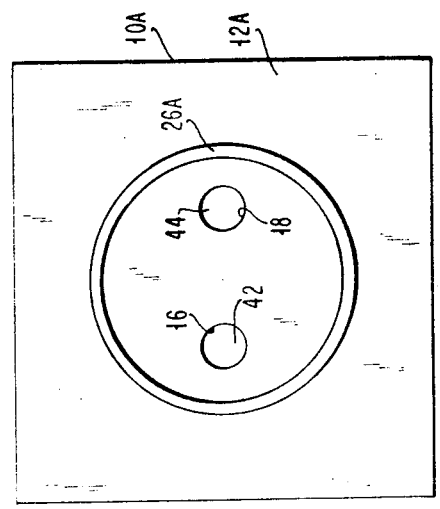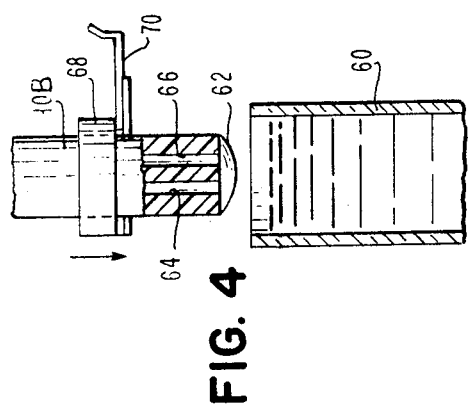

APPARATUS FOR PHOTOMETRICALLY ANALYZING A DROPLET OF A SAMPLE LIQUID

BACKGROUND OF THE INVENTION

1. Field of the Invention

A technique and apparatus for photometrically analyzing a droplet of a liquid sample for a qualitative or quantitative determination of a constituent of interest, or to indicate an end reaction.

2. Prior Art

Automated photometric analyses of wet chemicals and biological substances are now well known. Apparatus for conducting such analyses include that which utilizes discrete treated samples held for photometric examination in cuvettes. Such apparatus is illustrated and described in Natelson U. S. Pat. No. 3,216,804 issued Nov. 9, 1965, which patent also discloses a technique of depositing discrete droplets of samples for treatment on a movable tape which transfers the samples in the form of spots onto a test tape which carries the samples seriatum to a reading station. At this station an appropriate light filter, acting in combination with a light source at one side of the tape, cooperates with a photocell at the other side of the tape. Such last-named apparatus is stated to be useful in determining an analytical result such as the concentration of a particular constituent in a blood sample.

My U. S. Pat. application, Ser. No. 881,971 filed Dec. 4, 1969, now U.S. Pat. No. 3,650,698 discloses apparatus for the automatic determination of the coagulation, agglutination and/or flocculation rates of fluids utilizing an optical change in the end product, such as an agglutination, as an indicator. The change in the treated sample, which is carried on a movable tape, is registered by a photometric device.

Automated apparatus for photometric analysis of samples flowing seriatum in a continuous stream, utilizing a flow-through flowcell for photometric examination are well known. Such apparatus is illustrated and described in Skeggs et al. U. S. Pat. No. 3,241,432 issued Mar. 22, 1966. Detection of concentrations of particular constituents of liquid samples is now known to include techniques utilizing light absorbance, light scattering or fluorescence.

While the continuous-flow type of analysis has numerous advantages in many applications as compared to the discrete type of analysis, such as speed, certain circumstances may dictate the use of the discrete type of analysis. For example, it may be advantageous to avoid the use of a flow-through flow cell where the substance being tested in samples seriatum has a strong tendency to foul or contaminate such a flow cell and wherein conventional "wash" between samples is not adequate. This problem has been observed with reference to coagulation testing g of blood samples. The use of cuvettes to hold such samples for analysis also has disadvantages. One such disadvantage is the requirement of washing cuvettes between uses.

The aforementioned analysis of spots of sample substances has certain drawbacks. The above-mentioned analysis technique utilizing plural carrier tapes for the transfer of a discrete sample from a sample-receiving tape to a test tape requires a relatively large volume of sample because some of the sample is lost by remaining on the sample-receiving tape and any intermediate tape. It is frequently desirable or necessary to analyze a very small volume of sample such as approximately 15 microliters. Such a small volume of sample apparently would be lost or incapable of analysis using the spot technique. Another disadvantage is that such a sample spot, as opposed to a liquid sample droplet, provides only a relatively short light path through the sample for photometric analysis. A longer light path, as through a sample liquid droplet enables greater sensitivity of analysis as in detecting low concentrations of a sample constituent.

SUMMARY OF THE INVENTION

It is an object of the invention to overcome the previously stated shortcomings of the prior art to provide a method and apparatus for photometrically analyzing as by absorption, nephelometry or fluorescence a quantity of a sample while in liquid form, without the use of a flow cell or a cuvette. Another object is to provide such an analysis technique which is simple and which may be automated if desired. Still another object is to provide a technique for photometrically testing for a constituent of a droplet of a discrete liquid sample having an arcuate or domed surface and having a planar surface resting on or suspended from a surface and wherein light rays from a source are directed into the droplet through the planar surface thereof. Light energy is transmitted through the planar droplet surface to a photosensitive device for analysis of the sample which analysis may be qualitative or quantitative or indicate an end reaction such as an agglutination.

BRIEF DESCRIPTION OF THE DRAWING

In the drawing:

FIG. 1 is a somewhat diagrammatic view in elevation and partially in section illustrating apparatus embodying the invention;

FIG. 2 is a fragmentary top plan view partially broken away illustrating the apparatus of FIG. 1;

FIG. 3 is a top plan view illustrating a modified form of the invention; and

FIG. 4 is a fragmentary elevational view partially in section illustrating a further modification of the invention.

DETAILED DESCRIPTION OF THE PREFERRED EMBODIMENTS

In the form of the invention shown in FIGS. 1 and 2 there is illustrated a support in the nature of a vertically extending block 10 structured of an opaque material such as a suitable plastic. The support block has an upper planar surface portion 12 which is horizontally disposed. Provided on the upper surface of the block 10 is a guide for guiding the intermittent travel on the surface 12 of the block of a carrier web or tape, which guide is illustrated as formed by a pair of spaced parallel ribs 14 formed on the upper surface of the block 10 for guiding engagement with the respective side edges of such a tape intermittently moved in a direction across the support block.

The last-named support has a pair of vertically arranged spaced-apart light passages 16, 18 formed therein extending through the central region of the planar upper surface portion 12 of the block 10. The lower ends of the passageways 16, 18 are respectively enlarged as at 20 and 22.

A carrier web or tape for movement over and support from the block surface 12 is indicated generally at 24. This tape is transparent and may be conveniently structured of a plastic material sold under the trademark Mylar. It may be supplied in roll form, not shown, and may be supported and driven in the direction of the arrows in FIG. 1 by suitable rollers such as shown in my U. S. Pat. application Ser. No. 881,971, filed Dec. 4, 1969. Suitable disposition may be made of the tape as it leaves the block 10 in a direction to the right as viewed in FIG. 1, as by being collected in a waste receptacle. When the tape has left the block 10 it has served its function. As illustrated the tape 24 has but a single operational run which is in a horizontal plane.

The tape 24 has longitudinally spaced circular wells or raised surfaces 26 thereon each of which serves to confine on the central portion of the tape a quantity of liquid which liquid includes a sample. The liquid retaining rings 26 may be conveniently formed in the tape 24 by a thermo-forming operation.

Such a discrete quantity of liquid which has been collected on the tape in a manner to be described hereinafter and moved to a position over the support block 10 is in the form of a liquid droplet 28 having a domed or arcuate outer surface 30 and a planar surface 32. The planar surface rests on the tape 24. The arcuate surface 30 is exposed to the ambient atmosphere. The liquid droplet 28 which contains the sample may be made up of one or a relatively large number of liquid drops previously collected on the tape in the corresponding liquid retaining ring 26. The volume of the droplet 28 may be relatively very small, as on the order of 15 microliters, for example.

Each of the light passages 16, 18 has an input end and an output end. The input end of the passage 16 is lowermost and the output end is uppermost. The input and output ends of the passage 18 are reversed. The input end of the passage 18 is uppermost and the output end is lowermost. As shown in FIG. 1, the output end of the passage 16 and the input end of the passage 18 are under the planar surface 32 of the droplet 28 in the rest or analysis position of the droplet 28 shown in the last-mentioned view. Circumstances such as the volume of the droplet 28, for example, will dictate the diameter of the passageways 16, 18 and may dictate the spacing of these passageways from one another.

A light source in the form of a lamp 34 is located in the enlargement 20 of the passageway 16 and light rays from this lamp pass through the input and output ends of the passageway 16 and into the droplet 28 through the tape 26 and the planar droplet surface 32. Light energy within the droplet 28 is transmitted back through the planar surface 32 and the tape 24 and through the input and output ends of the light passageway 18 for detection by a photosensitive device 36 extending into the enlargement 22 of the last-named passageway which device 36 may take the form of a photocell. The photocell 36 is connected to an amplifier 38 and a recorder 40. Signals from the cell 36 may be used to detect the existence in the droplet 28 of an ingredient of interest, or may further indicate the concentration of such ingredient of interest.

The illustrated photometric technique for determining the concentration of the ingredient of interest is that utilizing with appropriate filters, not shown, the light absorbance at a particular wavelength of the ingredient of interest in the droplet 28. It is contemplated that, alternatively, the technique of analysis used may be the well known technique of light scattering, utilizing appropriate light stops or light filters, to detect the concentration of particulate matter in the droplet 28 utilizing a photomultiplier tube for the photosensitive device 36. It is further contemplated that, also alternatively, the disclosed apparatus may be utilized to detect the concentration of an ingredient of interest in the droplet 28 by fluorescence, another well known photometric technique.

To prevent debris from falling into the light passages 16 and 18, at least the upper ends of these passageways are closed by elements structured of a light transmitting material. If the diameter of the last-named passageways is relatively very small or these passageways are relatively long, it will be desirable to provide as shown transparent elements 42, 44 in the respective passageways 16, 18 having light piping characteristics which elements 42 and 44 extend a distance downwardly from the upper ends of the passageways 16, 18 as shown. The elements 42 and 44 may be structured as glass rods or bundles of optical quality fibers or as single fibers, again depending at least somewhat on the cross-sectional dimensions of the passageways 16, 18. It will be appreciated from the foregoing that the thusly filled light passages 16, 18 may be of any desired cross-sectional shape.

In the form of the apparatus under discussion, wherein the photometric analysis of the droplet 28 utilizes the principle of light absorption by the ingredient of interest in the droplet 28, light energy entering the droplet from the passageway 16 is reflected from the arcuate or domed outer surface 30 of the droplet interfacing with ambient air in the manner shown by broken lines within the droplet in FIG. 1. Sufficient reflected light enters and passes through the passageway 18 for detection and/or measurement at the appropriate wavelength by the photocell 36. It will be noted that the passageways 16, 18 have axial portions which are offset with reference to the center of the dome of the sample droplet 28.

To shield the outer surface 30 of droplet 28 from ambient light, an opaque cover 46 is provided which has a top and four depending side walls two of which straddle the tape rails or ribs 14 and rest for support on the upper surface 12 of the support 10. The remaining depending two walls of the cover 46 are provided with aligned apertures 48 for the travel therethrough with clearance of the tape 24 carrying the droplet 28. Such a shield structure may include light baffles not shown. It will be noted that the lamp 34 is shielded from the light detector 36 by the material of the support block 10.

The manner of depositing the required quantity of liquid sample and/or reagents or diluents in each well or ring 26 on the tape is not critical to the invention. There is shown in FIG. 1 by way of example a sample discharge tube 50 which discharges sample liquid a drop at a time onto a tape ring 26 when the tape is at rest and the ring 26 is properly indexed under the discharge tube 50 by the intermittent tape drive which may be under the control of a programmer not shown. The waste or collection tube 52 has an inlet immediately adjacent the outlet of the sample tube 50 and the collection tube 52, which may be to waste, has suction continuously applied thereto.

The waste tube 52 has intermediate the inlet end thereof and the source of suction a solenoid-operated valve, not shown, controlled from the photocell of a conventional drop counter, not shown, counting the drops falling free from the discharge tube 52 toward the tape, which valve when open permits all the liquid discharged by the tube 50 to enter the inlet of the tube 52 and be conveyed away to a remote collection point. When the last-mentioned valve is closed liquid discharged by the tube 50 drops on the tape. The liquid sample may be conveyed by the discharge tube 50 to the point of discharge by any conventional technique, not shown, creating the appropriate substantially constant pressure differential in the tube 50.

After the appropriate quantity of liquid sample has been discharged into the last-mentioned tape ring 26, the tape drive may be actuated again to index the last-mentioned tape ring 26 under another drop dispenser such as discharge tube 54 similar to discharge tube 50 but conveying a reagent or a diluent. It is to be understood, however, that the tape 24 in its manufacture may have a reagent applied suitably in the last-mentioned tape ring 26 and dried therein for later reaction with the sample after the above-described deposit of the sample on the tape. Therefore it will be apparent that it may be unnecessary to provide the discharge tube 54 in the apparatus. The liquid discharge tube 54 may have associated therewith a valved suction tube 56 similar to the valved suction tube 52 and controlled by the drop counter counting liquid drops dispensed by the tube 54 and controlling the number of drops dispensed into the last-mentioned tape ring.

When the dispensing operation at the last-mentioned drop dispensing station is completed, the tape drive mechanism is reactuated to index the droplet in the last-mentioned ring, which is then of a size or volume similar to that of the droplet 28, into registry with the analysis station over the support block 10. Of course, during this movement any droplet previously at the analysis station is removed therefrom by movement of the tape as previously described. It will be understood from the foregoing that one treated sample droplet after another travelling on the tape 24 may be analyzed in the manner previously described in an automated fashion.

The apparatus of FIGS. 1 and 2, is also suitable for detection of an end reaction such as an agglutination, for example, as in my U.S. Pat. application Ser. No. 881,971, filed Dec. 4, 1969. The apparatus of FIGS. 1 and 2 may also include a magnetic stirring device as disclosed by the last-mentioned patent application for mixing a quantity of a liquid sample on a tape with a reagent or diluent.

The modified form of the invention illustrated in FIG. 3 may be identical in all respects to that shown in FIGS. 1 and 2 except that the apparatus of FIG. 3, in which the light shield similar to the light shield 46 previously described is not shown for the sake of simplicity of illustration, does not employ the sample carrying tape or the drop dispensers of the form of FIG. 1. Instead, the treated droplet, having a configuration similar to the illustrated droplet 28, is supported directly on the upper surface portion 12A of a support block 10A, and is confined on the last-mentioned surface in a manner similar to the confinement of the droplet 28 by an annular rib 26A formed directly on the surface 12A of the support block 10A. The droplet for analysis, not shown for the sake of simplicity of illustration, may be formed within the ring 26A by any conventional technique for depositing drops of a liquid on a supporting surface. After analysis of the droplet on the apparatus, the droplet is removed as by washing the droplet off the upper surface of the support block 10A.

In the modified form of the invention illustrated in FIG. 4, the support 10B is in the form of an elongated dipping probe for the manual immersion of one end portion of the support 10B into a treated sample liquid contained in a cuvette 60 or the like. When the last-mentioned end portion of the probe 10B is withdrawn from the treated sample liquid in the receptacle, a single droplet 62 is formed and suspended by surface tension from the last-mentioned end portion which terminates in a planar surface similar to the surface 12 previously described. The probe-like support 10B, which is cylindrical in cross section, may be formed of any suitable opaque material. The external surface of the last-mentioned end portion of the support 10B may be at least somewhat hydrophobic and toward this end may be conventionally treated to achieve this characteristic.

As previously indicated, the support probe is rod-shaped and it may have an outer wall structure which is very thin in the form of a shell. A pair of axially extending light passageways 64 and 66, which may be arranged concentrically of one another but are not illustrated as such, similar to the previously described passageways 16 and 18, are provided in the support 10B for connection at corresponding ends to a light source and a photosensitive device, respectively, such as those shown in FIG. 1. As indicated in FIG. 4 the light passageways 64 and 66 extend through the end of the support probe 10B which is immersed in the sample liquid, and the passageways 64 and 66 are filled in a similar manner with light piping elements, not shown, similar to the previously described elements 42 and 44 to convey light along the passageways 64, 66.

It will be noted that the sample droplet 62, similar in shape to the sample droplet 28 previously described, does not require confinement as by the ring 26A of the form of FIG. 3 inasmuch as the droplet 62 is suspended in the ambient atmosphere and held to the support 10B by surface tension.

To shield the arcuate or domed outer surface of the droplet 62 from ambient light during analysis of the droplet, a shield is provided comprising a tubular part 68 embracing the last-mentioned end portion of the support probe 10B and is slidable axially on the support 10B within limits defined by conventional stops, not shown, so that it may be moved from its retracted position of FIG. 4 to an extended position in which it extends over the droplet 62. A cover plate 70 may be included in the shield to slide in and out of the lowermost end of tubular part 68. When the tubular part 68 extends over the droplet the cover plate may be extended into the tubular part 68 to completely close the lower end thereof. Of course in this position the cover plate 70 has clearance with the droplet 62.

While several forms of the invention have been illustrated and described, it will be apparent to those versed in the art that the apparatus may take other forms, and is susceptible of various changes in details without departing from the principles of the invention.

What is claimed is:

1. In apparatus for testing for a constituent of a sample in liquid form, a support for vertical disposition having a horizontal surface portion, means defining a pair of vertically arranged light passageways in said support each shielded axially along its length, said passageways extending through said horizontal surface portion and each having input and output ends, said output end of one of said passageways being at said surface portion and said input end of the other of said passageways being at said surface portion, means structured of light-transmitting material closing said passageways at least at the last-named output and input ends, a shielded light source rays from which enter said input end of said one of the passageways, a shielded light detector coupled to said output end of said other one of the passageways, said surface portion providing support for a droplet of said liquid sample having a meniscus forming an outer light-refractive surface of dome shape in the ambient atmosphere and a planar inner surface extending over both of said passageways, said inner surface transmitting light from said source into said droplet and transmitting light returned from the meniscus of said droplet to said passageway coupled to said light detector, for analysis of such droplet constituent, and means to shield said droplet from ambient light outwardly from said outer droplet surface.

2. Apparatus as defined in claim 1, wherein:
said means structured of light-transmitting material is formed respectively as a light pipe extending a distance along the respective passageway.

3. Apparatus as defined in claim 1, wherein:
said light passageways are arranged in parallelism with one another.

4. Apparatus as defined in claim 1, wherein:
said light detector is a photosensitive device for detecting the presence in said sample liquid droplet of a constituent of interest.

5. Apparatus as defined in claim 1, wherein:
said light detector is a photosensitive device for detecting by light absorbance the concentration in said sample liquid droplet of a constituent of interest.

6. Apparatus as defined in claim 1, wherein:
said light detector is a photosensitive device for detecting by light scattering the concentration in said sample liquid droplet of particles.

7. Apparatus as defined in claim 1, wherein:
said light detector is a photosensitive device for detecting by fluorescence the concentration in said sample liquid droplet of a constituent of interest.

8. Apparatus as defined in claim 1, wherein:
said means structured of light transmitting material is formed respectively as a light pipe extending a distance along the respective passageway, said light detector being a photosensitive device for detecting by light absorbance a concentration in said sample liquid droplet of a constituent of interest.

9. Apparatus as defined in claim 1, further comprising a transparent tape supported directly on said horizontal surface portion for supporting said liquid droplet.

10. Apparatus as defined in claim 1, further comprising a transparent tape supported directly on said horizontal surface portion for supporting said liquid droplet, said tape having means defining thereon an annulus retaining the sample liquid droplet.

11. Apparatus as defined in claim 1, wherein:
said horizontal surface portion directly supports the sample liquid droplet thereon, said horizontal surface portion having formed thereon an annulus for retaining the droplet.

12. Apparatus as defined in claim 1, wherein:
said support is formed as an elongated sample-dipping probe for the immersion of said horizontal surface portion in a sample liquid for withdrawing from said liquid a sample droplet adhering to said horizontal surface portion by surface tension.

13. A method for photometrically analyzing a liquid droplet for a constituent of interest comprising the steps of:
supporting said droplet on an essentially horizontal surface in ambient atmosphere so that its meniscus forms a dome-shaped outer surface and the inner surface of the droplet adjoins said horizontal surface directing in a shielded manner light from a light source through a portion of the support and a portion of said inner droplet surface for passage into the droplet and refraction within the droplet from the meniscus, while shielding the meniscus from ambient light without the droplet, and detecting the amount of light returned from the meniscus back through another portion of said inner droplet surface and a portion of the support in a shielded manner at a selected wavelength to indicate the constituent of interest in the droplet.

* * * * *